(12) United States Patent
Benjamin et al.

(10) Patent No.: US 6,168,082 B1
(45) Date of Patent: Jan. 2, 2001

(54) CARD READER ASSEMBLY

(75) Inventors: Karen Elizabeth Benjamin, Harrisburg; Dennis Leroy Kemmick, Columbia, both of PA (US)

(73) Assignee: The Whitaker Corporation, Wilmington, DE (US)

( * ) Notice: Under 35 U.S.C. 154(b), the term of this patent shall be extended for 0 days.

(21) Appl. No.: 09/106,439

(22) Filed: Jun. 29, 1998

Related U.S. Application Data

(60) Provisional application No. 60/051,329, filed on Jun. 30, 1997.

(51) Int. Cl.[7] .................................................... G06K 13/00
(52) U.S. Cl. .......................................... 235/475; 439/630
(58) Field of Search ................................... 235/439, 441, 235/486, 492, 475; 902/26; 439/630; 361/737

(56) References Cited

U.S. PATENT DOCUMENTS

| | | | |
|---|---|---|---|
| 4,675,516 | 6/1987 | Guion | 235/441 |
| 4,735,578 | 4/1988 | Reichardt et al. | 439/152 |
| 4,859,199 | 8/1989 | Komatsu | 439/267 |
| 4,900,272 | 2/1990 | Lange | 439/630 |
| 4,900,273 * | 2/1990 | Pernet | 439/630 |
| 4,938,716 | 7/1990 | Chabrolle et al. | 439/635 |
| 5,013,255 * | 5/1991 | Juret et al. | 439/260 |
| 5,169,345 | 12/1992 | Pernet | 439/630 |
| 5,259,777 * | 11/1993 | Schuder et al. | 439/188 |
| 5,463,210 | 10/1995 | Imura | 235/441 |
| 5,667,397 * | 9/1997 | Broschard, III et al. | 439/188 |
| 5,667,408 * | 9/1997 | Broschard, III et al. | 439/630 |
| 5,896,274 * | 4/1999 | Ishida | 361/737 |
| 5,941,723 * | 8/1999 | Yu | 439/328 |
| 5,945,662 * | 8/1999 | Vallat | 235/492 |

FOREIGN PATENT DOCUMENTS

| 195 00 636 A1 | 1/1996 | (DE) | H01R 23/68 |
|---|---|---|---|

* cited by examiner

Primary Examiner—Donald Hajec
Assistant Examiner—Diane I. Lee
(74) Attorney, Agent, or Firm—Michael Aronoff

(57) ABSTRACT

A card reader 10 includes a base 14 and a cover 60 securable together to define a card-receiving cavity 90 and a plurality of right angle terminals 102 therein disposed in a terminal housing 12. The base 14 defines a terminal-receiving section 32 of the terminal housing 12 and the cover 60 defines a terminal-securing section 74 of the terminal housing 12, the two sections together defining terminal-receiving passageways 79 within which the bodies of the terminals 102 extend. Upon assembling the base 14 and cover 60 together, the terminals 102 are secured in position in the terminal-receiving passageways and the terminal contact surfaces 106 extend into the cavity 90 proximate the cover 60, and a card 170 can be inserted into the cavity 90 with the contact pads 172 facing the cover 60.

13 Claims, 7 Drawing Sheets

CARD READER ASSEMBLY

This application claims benefit of provisional application No. 60/051,329, filed Jun. 30, 1997.

FIELD OF THE INVENTION

This invention is directed to card reader assemblies having terminals therein for electrically engaging contact pads on the surface of a card.

BACKGROUND OF THE INVENTION

Card reader assemblies for smart cards, SIM cards or the like typically include a housing having a base and a cover and a plurality of terminals disposed in the base for reading contact pads on a card. In these arrangements the cards typically are inserted with the contact pads directed toward the circuit board to which the reader is attached. U.S. Pat. Nos. 5,520,551 and 5,667,397 disclose card reader assemblies of this type.

In some instances, however, it is desirable to have a card reader assembly in which the card can be inserted into the card-receiving cavity with the contact pads directed away from the circuit board. It is desirable, therefore, to have the terminals in the connector assembly mounted such that they extend proximate the cover of the assembly rather than through the base, such that the card can be inserted between the terminals and the circuit board.

SUMMARY OF THE INVENTION

The present invention is directed to a card reader having a base, a cover securable to the base to define a card-receiving cavity, and a plurality of terminals disposed therein and therebetween and secured by cooperating surfaces between the base and the cover. Upon assembling the base and cover together, the terminals are secured in position with terminal contact surfaces extending into said cavity to be engaged by contact pads of a card inserted into said cavity.

In one embodiment the base and the cover further define a terminal housing in which a plurality of right angle terminals are disposed, each terminal having a body, a card engaging section at an end of a horizontal body section extending into the cavity, and a board mounting section at an end of a vertical body section extending outwardly of the card reader. The base defines a terminal-receiving section of the terminal housing and the cover defines a terminal-securing section of the terminal housing, the two sections together defining terminal-receiving passageways within which the bodies of the terminals extend. The terminal-receiving section of the base includes first and second portions, the first portion extending upwardly above a bottom surface of, and at an inner end of, the card-receiving cavity and the second portion extending outwardly from the base at a right angle to the first portion. The vertical body portion of the terminals are disposed along grooves of the second portion of the terminal-receiving section of the base and the horizontal body sections extend along a top surface of the first portion with elongate end portions of the horizontal body sections extending forwardly from the top surface to the card engaging sections. The terminal-securing section of the cover includes a downwardly directed portion that cooperates with the second portion of the terminal-receiving section, with an inner surface of the cover being opposed from the first portion of the terminal-receiving section adjacent the terminals. Upon assembling the base and cover together, the terminals are secured in position in the terminal-receiving passageways and the terminal contact surfaces extend into the cavity proximate the cover. A card, therefore, can be inserted into the cavity with the contact pads facing the cover.

It is an object of the present invention to provide a board mountable card reader that allows cards having contact pads on the surface thereof to be inserted into the card reader with the contact pads directed away from the circuit board to which the reader is attached.

An embodiment of the invention will now be described by way of example with reference to the accompanying drawings.

DETAILED DESCRIPTION OF AN EMBODIMENT OF THE INVENTION

Figure 1:
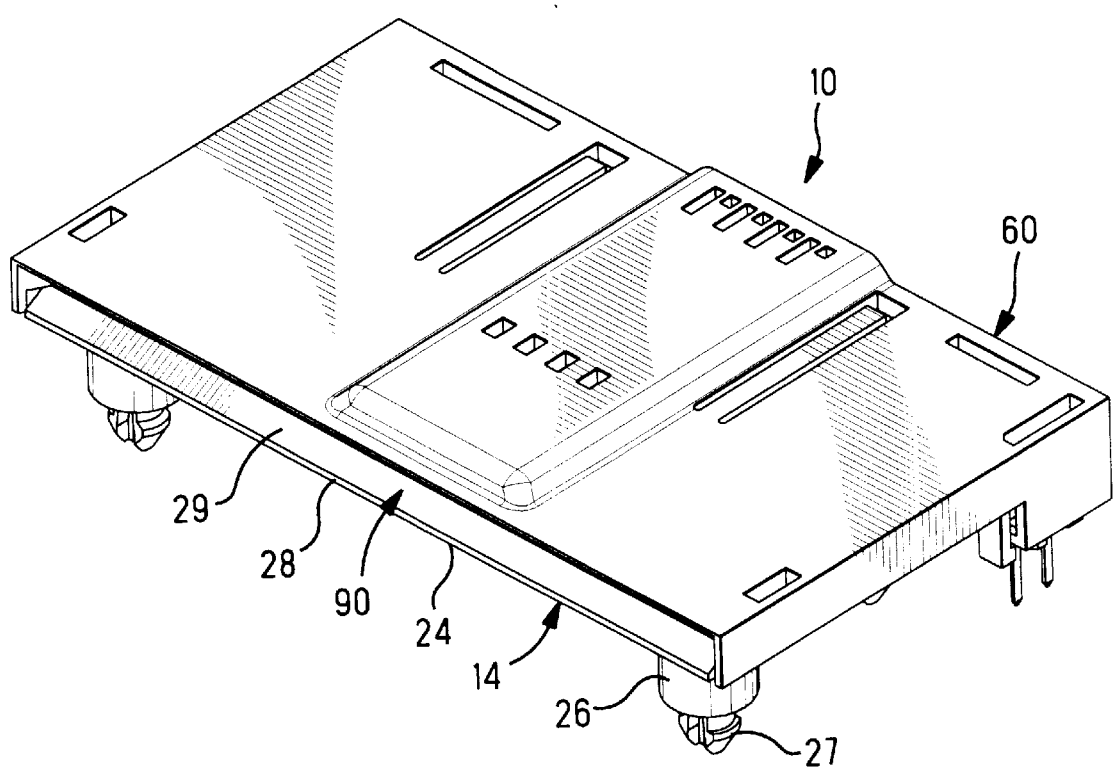
FIG. 1 is an isometric view of the card reader assembly made in accordance with the invention.
Figure 4:
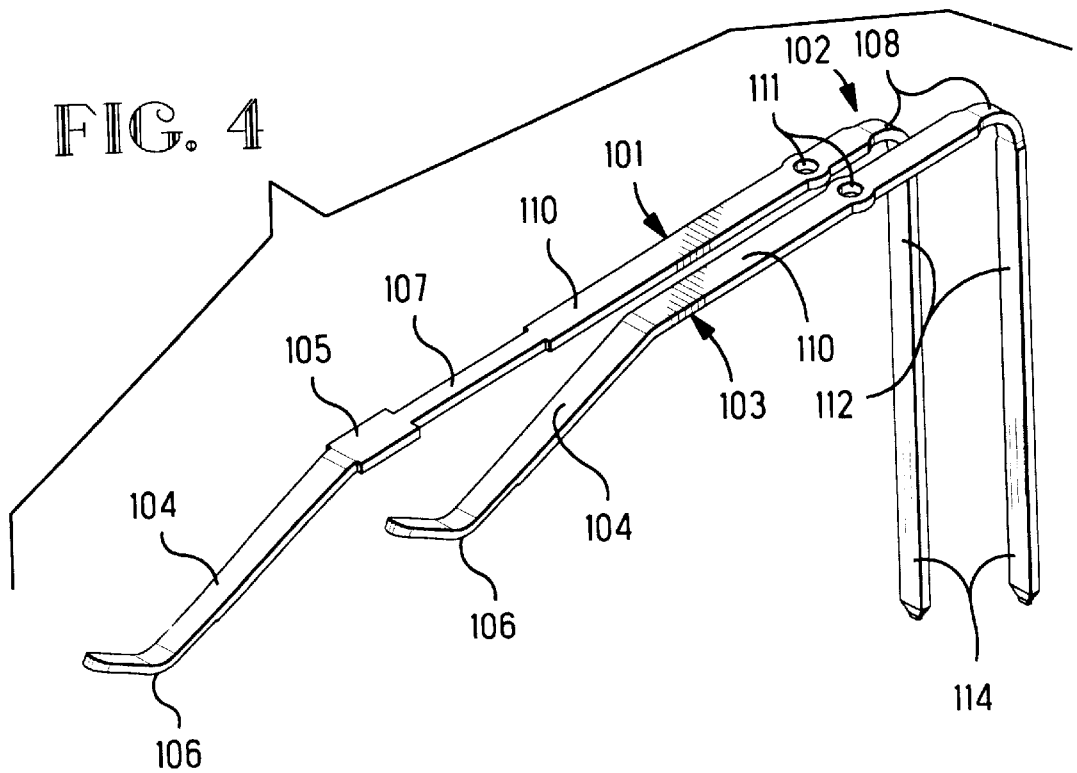
FIG. 4 is an isometric view of two of the terminals used in the assembly.
Figure 2:
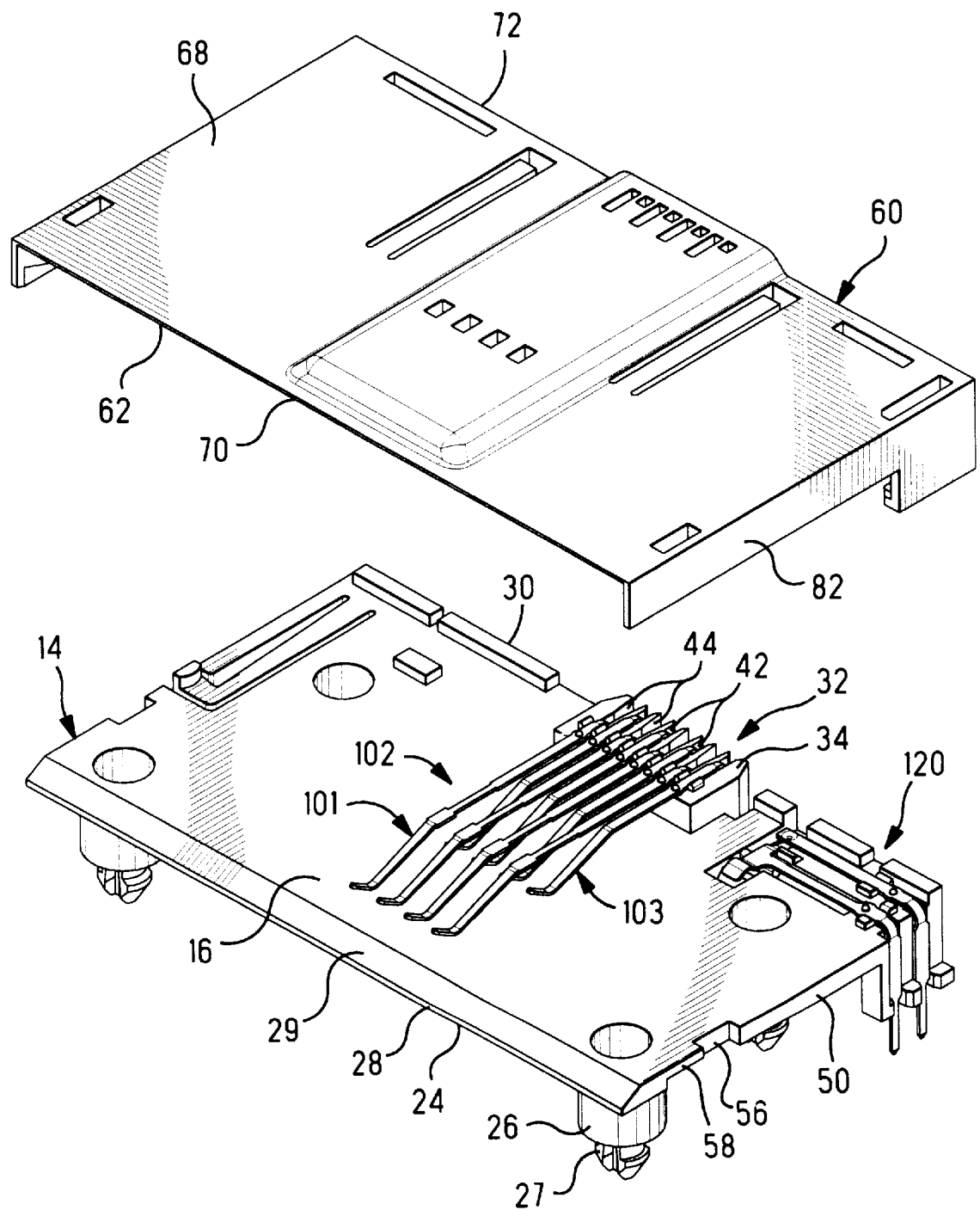
FIG. 2 is an isometric view of the assembly of FIG. 1 with the cover exploded therefrom and illustrating the position of the terminals within the base of the housing.

Referring now to FIGS. 1 through 11, the card reader assembly 10 has a base 14 and cover 60 securable together to define a card-receiving cavity 90 and a terminal housing 12 in which a plurality of right angle terminals 102 are disposed. Base 14 defines a terminal-receiving section 32 of the terminal housing 12 and cover 60 defines a terminal-securing section 74 of the terminal housing 12, the two sections 32, 74 together defining terminal-receiving passageways 79 within which bodies of terminals 102 extend, as best seen in FIGS. 6, 8, 10 and 11.

Figure 3:
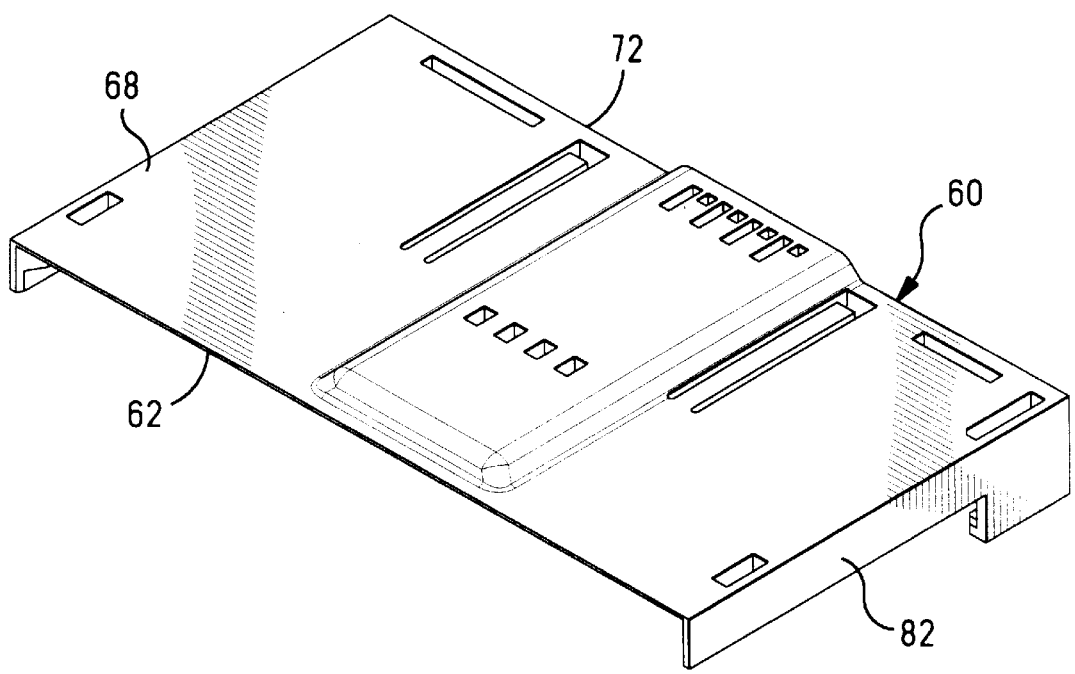
FIG. 3 is an exploded view of the assembly of FIG. 1 with the cover and the terminals exploded from the base.
Figure 3:
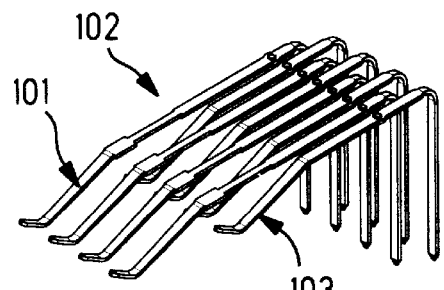
Figure 3:
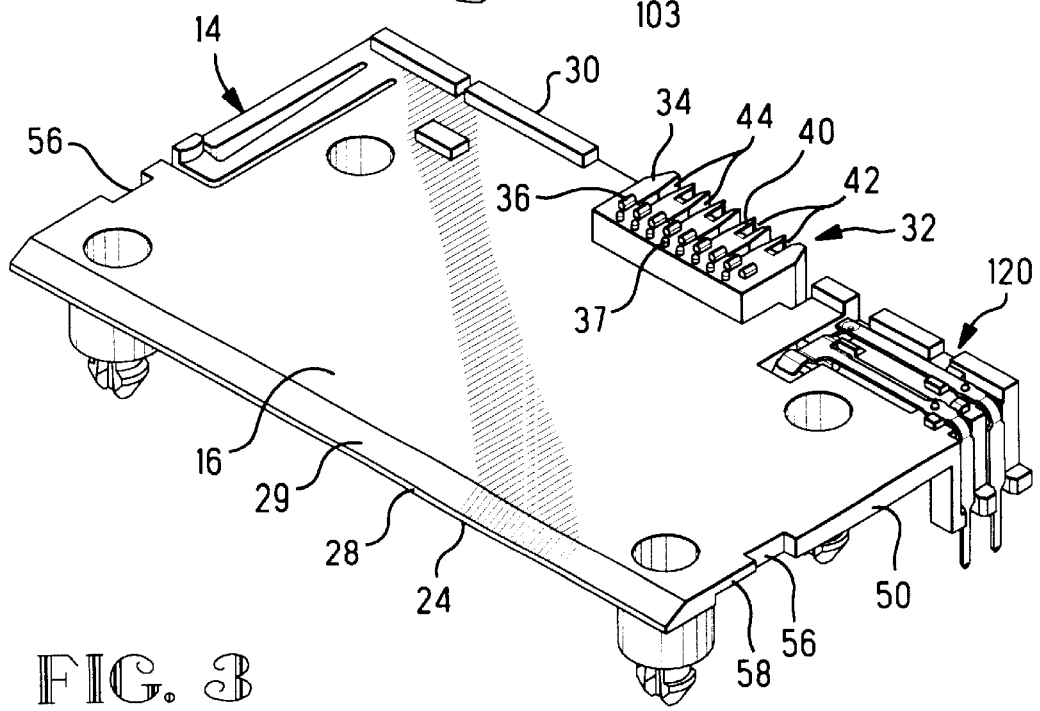
Figure 5:
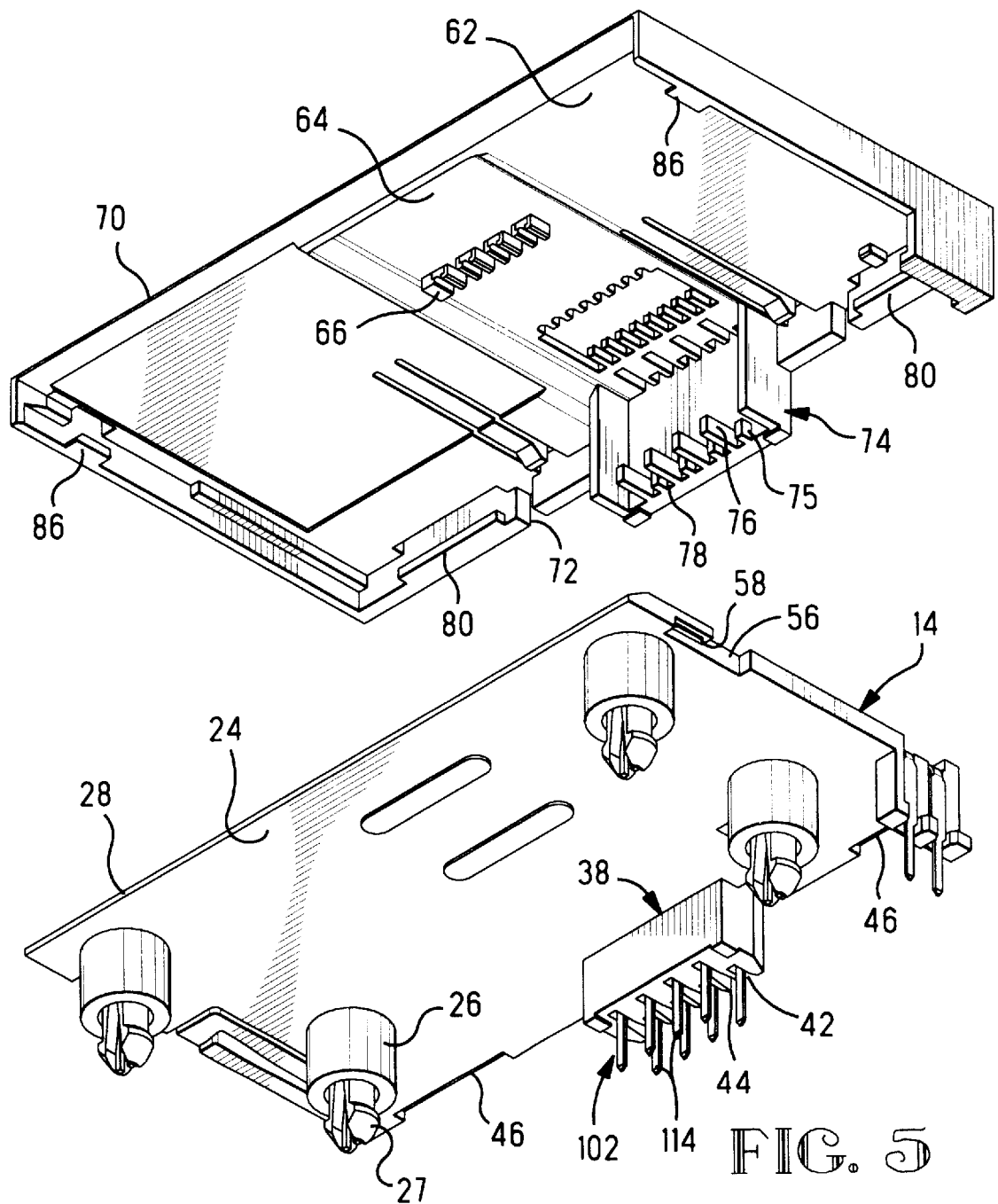
FIG. 5 is an exploded view of the assembly looking at the bottom of the base and the inside of the cover.

Base 14 includes opposed inner and outer surfaces 16, 24 and has a forward face 28 having a card lead-in surface 29, a rear wall 30, and sides 50. Base 14 defines a terminal-receiving section 32 of the terminal housing 12 having first and second portions 34, 38. The first portion 34 extends upwardly above the inner surface 16 of and at the inner end of, the card-receiving cavity 90. The first portion 34 includes an array of projections, shown as embossments 36 and protrusions 37, used to position and hold the terminals 102 against lateral movement within the card-receiving cavity 90. The second portion 38 of the terminal-receiving section includes a plurality of walls 40 defining alternating shallow and deep grooves 42, 44 as best seen in FIGS. 3 and 5. Grooves 42, 44 are dimensioned to receive vertical body portions of terminals 102 therein as described hereinafter. For purposes of mounting the assembly 10 to a circuit board the outer surface 24 of base 14 includes standoffs 26 and board locks 27 extending therefrom. It is to be understood that other means may be used to connect the housing to the board.

Figure 10:
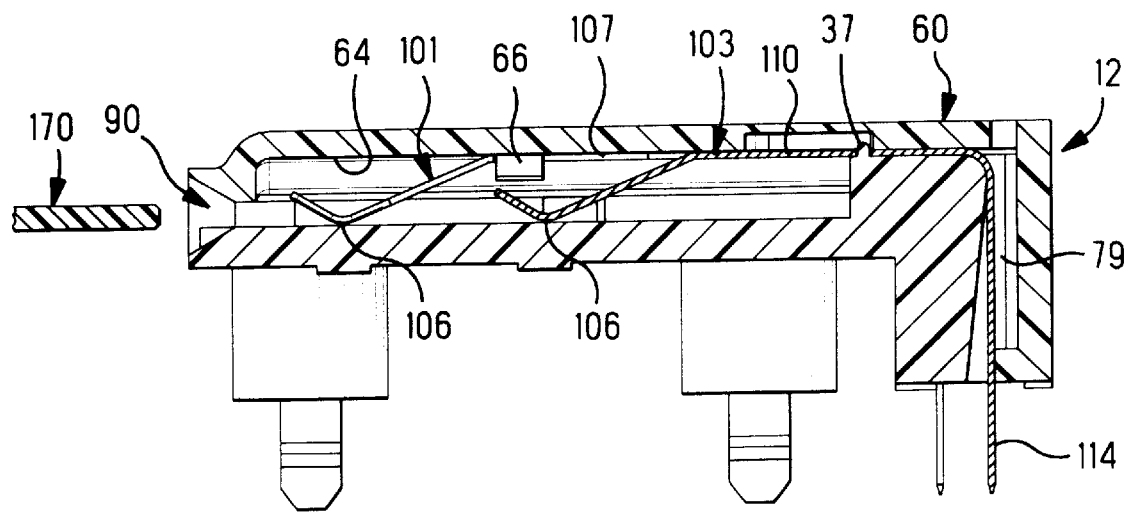
FIG. 10 is a cross-sectional view of the assembly of FIG. 1 illustrating the card receiving cavity prior to insertion of a card into the reader.
Figure 11:
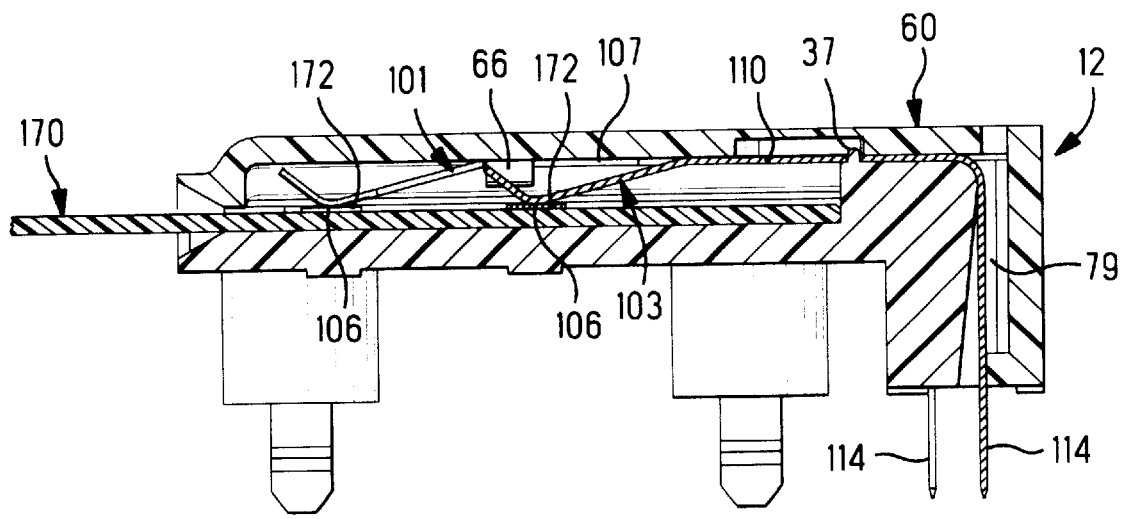
FIG. 11 is a cross-sectional view of the assembly of FIG. 10 illustrating the card receiving cavity after insertion of a card into the reader.

The cover 60 includes inner and outer surfaces 62, 68. Inner surface 62 includes a recessed portion 64 extending from the forward edge 70 to the rear wall 72. The recessed portion 64 further includes an array of terminal retention flanges 66 extending toward cavity 90. Terminal-securing section 74 includes a downwardly directed portion having an array of short and long wall sections 75, 76 at the outer end thereof and defining grooves 78 therebetween. When the base 14 and cover 60 are secured together, the wall sections 75, 76 of terminal-securing section 74 are received in the respective grooves 42, 44 of the second portion 38 of terminal-receiving section 32. Wall sections 75, 76 cooperate with grooves 42, 44 to define the terminal-receiving passageways 79, as best seen in FIGS. 10 and 11.

Each terminal 102 includes a body 108, a card engaging section 104 at an end of a horizontal body section 110 and a board mounting section 114 at an end of a vertical body section 112 extending outwardly of the card reader. Card engaging section 104 has contact surface 106 thereon. As can be seen from FIGS. 2, 3, and 4, the terminals 102 include alternating long and short terminals 101 and 103, each dimensioned to be electrically engaged with a card 170 having two rows of contact pads 172 thereon. As can be seen in FIGS. 10 and 11, each terminal 102 includes an aperture 111 dimensioned to receive a corresponding protrusion 37 on first terminal-receiving portion 34. Terminals 101 also include a notched section 107 and a wider portion 105 for being secured within the cover 60 by the retention flanges 66, as shown in FIGS. 10 and 11. Terminals 102 are stamped and formed from a suitable metal, such as phosphor bronze or the like, and then plated with a desired plating, as known in the art. It is to be understood that other means may be used to capture the terminals in the housing.

For purposes of assembly the base 14 further includes a plurality of recesses 46 extending into the outer surface 24 thereof, which cooperate with corresponding bosses 80 of cover 60 and to secure the cover and base along the rear edge, as best seen in FIG. 5. Cover 60 further includes inwardly directed flanges 86 proximate the forward edge 70 thereof that are engageable in corresponding flange-receiving openings 56 of the base 14 and moveable into flange slots 58 as the cover 60 is moved forwardly onto base 14.

Figure 6:
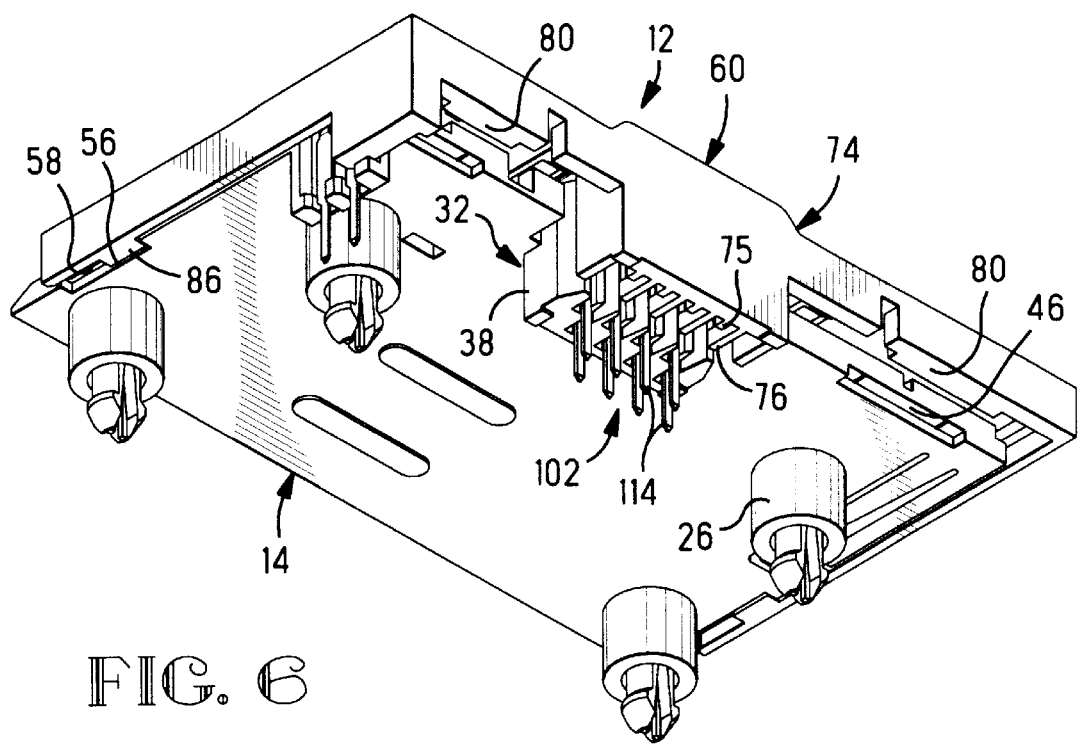
FIG. 6 is a view similar of that of FIG. 5 showing the cover and base assembly partially assembled.
Figure 7:
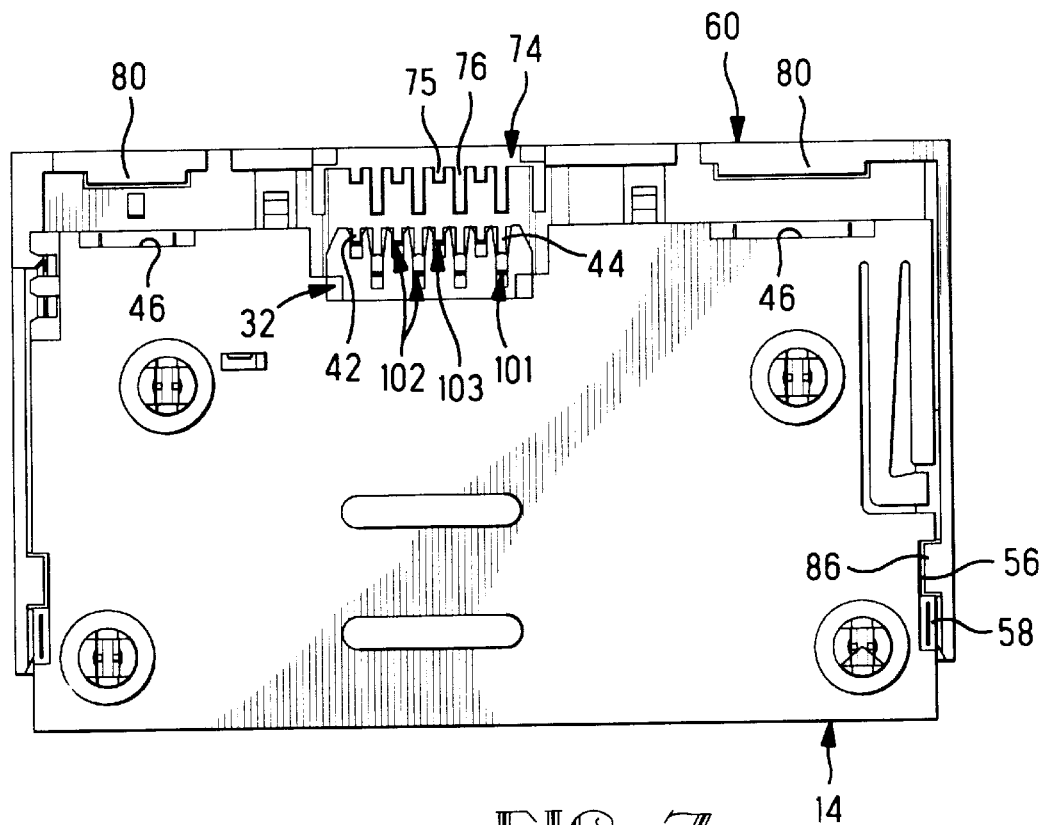
FIG. 7 is a bottom plan view of the partially assembled card reader assembly of FIG. 6.
Figure 8:
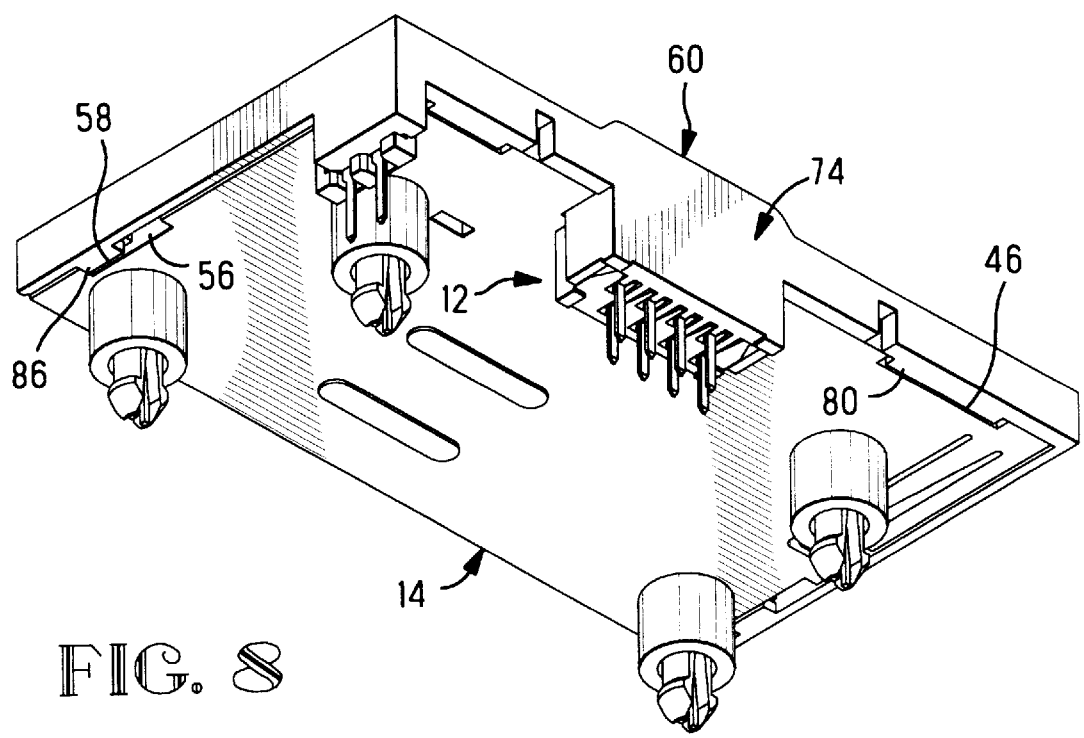
FIG. 8 is a view similar to that of FIG. 6 showing the fully assembled card reader.
Figure 9:
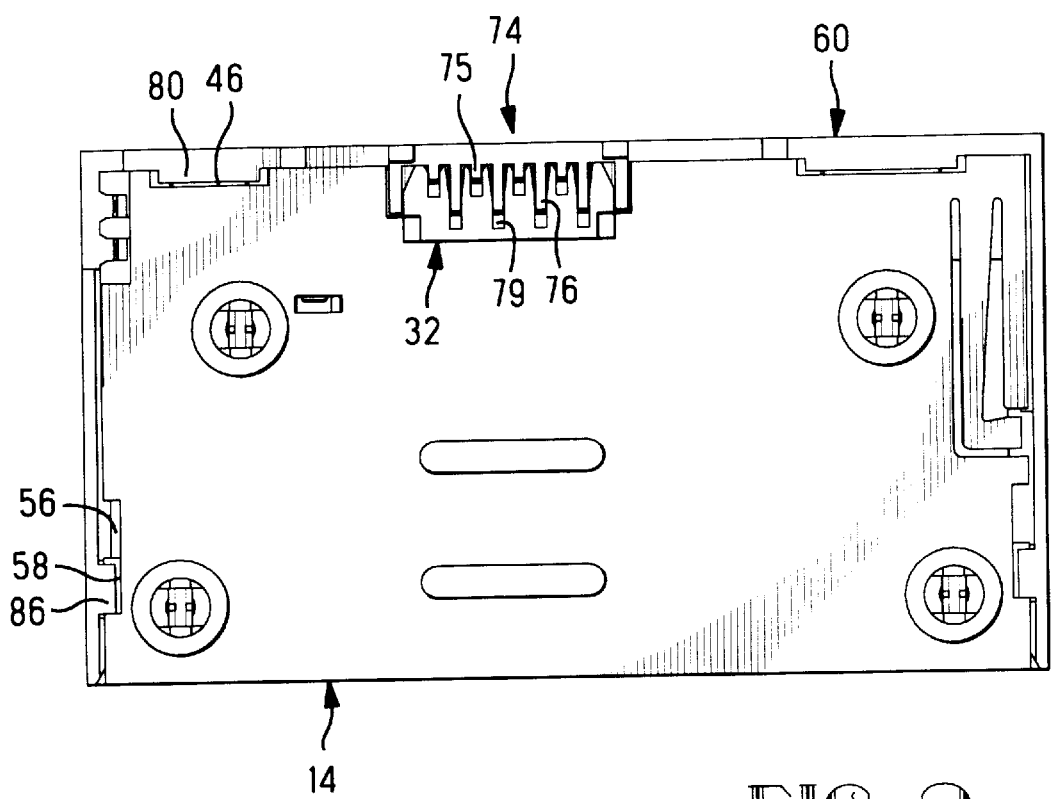
FIG. 9 is a bottom plan view of the assembly of FIG. 8.

Card reader assembly 10 is assembled in the following manner, the terminals 101, 103 are positioned in the respective grooves 42, 44 of the base 14 with the apertures 111 being secured to the protrusions 37 of the first terminal-receiving portion 34 between the respective embossments 36, thus holding the terminals in alignment from side to side and front to back and preventing rotation. Upon placing the cover 60 in position, as shown in FIGS. 6 and 7, the long and short wall portion 75, 76 enter the respective shallow and deep grooves 42, 44 of the second terminal-receiving portion 38 of the base. When the cover 60 is initially placed rearwardly of base 14, the retention flanges 66 are disposed around the notched portion 107 of terminals 101. Concomitantly therewith, the corresponding flanges 86 enter the respective flange-receiving openings 56 and bosses 80 align with the recesses 46 along the bottom surface of the base. As the cover 60 is moved forwardly the retention flanges 66 are moved forwardly along terminals 101 and engage the wider portion 105 of the terminal body forward of the notched portion 107 thereby securing the horizontal body section 110 of the terminals 101 in position. Upon sliding the cover 60 forwardly on the base 14, the short and long wall portions 75, 76 move into the respective shallow and deep grooves 42, 44, thereby trapping the terminals 102 within the passageways 79. The flanges 86 move forward in the flange-receiving slots 58 and the bosses 80 move into the recesses 46 thus securing the housing at the rearward and forward sections and securely positioning the terminals 102 in the terminal housing 12, as best seen in FIGS. 8 and 9. The process of securing a base and cover of a card reader together is further described in U.S. patent application Ser. No. 08/984,612. It is to be understood that other ways may be used to assemble a base and cover together.

FIGS. 10 and 11 are cross-sectional views showing the position of the card engaging sections 106 of terminals 101 and 103 in alignment for engaging pads 172 on a circuit board 170 in FIG. 10 and engaged with the corresponding pads 172 in FIG. 11. These figures also show the upper surface of horizontal bodies 110 of the respective terminals 102 lying along the surface 64 of cover 60 and the lower surface of horizontal bodies 110 against the top surface of terminal-receiving section 32, thus preventing terminals 102 from moving vertically in the assembly 10.

In the embodiment shown base 14 also includes an end position switch 120, the details of which are discussed in U.S. patent application Ser. No. 09/106,437 , filed concomitantly herewith. It is to be understood that the card reader will function with or without the end position switch and with other end position switches.

The present invention provides a board mountable card reader that allows cards having contact pads on the surface thereof to be inserted into a reader with the contact pads facing away from the circuit board and toward the cover of the reader.

It is thought that the card reader of the present invention and many of its attendant advantages will be understood from the foregoing description. It is apparent that various changes may be made in the form, construction, and arrangement of parts thereof without departing from the spirit or scope of the invention, or sacrificing all of its material advantages.

We claim:

1. A card reader includes a base and a cover securable together to define a card-receiving cavity and a terminal housing in which a plurality of right angle terminals are disposed, each terminal having a body, a card engaging section at an end of a horizontal body section extending into said cavity, and a board mounting section at an end of a vertical body section extending outwardly of said card reader, the card reader being characterized in that:

said base defines a terminal-receiving section of said terminal housing and said cover defines a terminal-securing section of said terminal housing, the two sections together defining terminal-receiving passageways within which said bodies of said terminals extend;

said terminal-receiving section of said base includes first and second portions, said first portion extending upwardly above a bottom surface of, and at an inner end of, said card-receiving cavity and said second portion extending outwardly from said base at a right angle to said first portion;

said vertical body portion of said terminals being disposed along grooves of said second portion of said terminal-receiving section of said base and said horizontal body sections extending along a top surface of said first portion with elongate end portions of said horizontal body sections extending forwardly from said top surface to said card engaging sections; and said terminal-securing section of said cover includes a downwardly directed portion that cooperates with said second portion of said terminal-receiving section, with an inner surface of said cover being opposed from said first portion of said terminal-receiving section adjacent said terminals;

whereby, upon assembling said base and cover together, said terminals are secured in position in the terminal-receiving passageways and said terminal contact surfaces extend into said cavity proximate said cover, and a card can be inserted into said cavity with the contact pads facing said cover.

2. The card reader of claim 1 wherein said first portion of said terminal-receiving section includes an array of projections used to position and hold the terminals against lateral movement within the card-receiving cavity.

3. The card reader of claim 1 wherein said second portion of said terminal-receiving section includes a plurality of walls defining said grooves.

4. The card reader of claim 1 wherein said walls define alternating shallow and deep grooves.

5. The card reader of claim 1 wherein an inner surface of said cover includes a recessed portion having an array of terminal retention flanges extending toward said card-receiving cavity.

6. The card reader of claim 1 wherein said terminal-securing section of said cover includes an array of short and long wall sections defining grooves therebetween, said short and long wall sections being adapted to cooperate with respective grooves of said second portion of said terminal-receiving section of said base to define said terminal-receiving passageways.

7. An assembly comprising:

a card reader including a base and a cover securable together to define a card-receiving cavity and a terminal housing in which a plurality of right angle terminals are disposed;

each terminal having a body, a card engaging section at an end of a horizontal body section extending into said cavity, and a board mounting section at an end of a vertical body section extending outwardly of said card reader;

said base defines a terminal-receiving section of said terminal housing and said cover defines a terminal-securing section of said terminal housing, the two sections together defining terminal-receiving passageways within which said bodies of said terminals extend;

said terminal-receiving section of said base includes first and second portions, said first portion extending upwardly above a bottom surface of, and at an inner end of, said card-receiving cavity and said second portion extending outwardly from said base at a right angle to said first portion;

said vertical body portion of said terminals being disposed along grooves of said second portion of said terminal-receiving section of said base and said horizontal body sections extending along a top surface of said first portion with elongate end portions of said horizontal body sections extending forwardly from said top surface to said card engaging sections; and said terminal-securing section of said cover includes a downwardly directed portion that cooperates with said second portion of said terminal-receiving section, with an inner surface of said cover being opposed from said first portion of said terminal-receiving section adjacent said terminals; and a card having a plurality of contact pads on a surface thereof, said card inserted into said reader with the contact pads facing said cover and in electrical engagement with said card-engaging sections of respective said terminals.

8. The assembly of claim 7 wherein said first portion of said terminal-receiving section includes an array of projections used to position and hold the terminals against lateral movement within the card-receiving cavity.

9. The assembly of claim 7 wherein said second portion of said terminal-receiving section includes a plurality of walls defining said grooves.

10. The assembly of claim 7 wherein said walls define alternating shallow and deep grooves.

11. The assembly of claim 7 wherein an inner surface of said cover includes a recessed portion having an array of terminal retention flanges extending toward said card-receiving cavity.

12. The assembly of claim 7 wherein said terminal-securing section of said cover includes an array of short and long wall sections defining grooves therebetween, said short and long wall sections being adapted to cooperate with respective grooves of said second portion of said terminal-receiving section of said base to define said terminal-receiving passageways.

13. A card reader includes a base and a cover securable together to define a card-receiving cavity and a terminal housing in which a plurality of right angle terminals are disposed, each terminal having a body, a card engaging section at an end of a horizontal body section extending into said cavity, and a board mounting section at an end of a vertical body section extending outwardly of said card reader, the card reader comprising:

a terminal-receiving section and a terminal-securing section, the two sections together defining terminal-receiving passageways housing said bodies of said terminals;

the terminal-securing section including a downwardly directed portion that cooperates with the terminal-receiving section, with an inner surface of said cover being opposed from said first portion of said terminal-receiving section adjacent said terminals;

whereupon securing the base and cover together, the terminals are secured in the terminal-receiving passageways.

* * * * *